Feb. 25, 1930.                M. MACDONALD                1,748,235
                              TICKET BOX SUPPORT
                              Filed Oct. 5, 1927
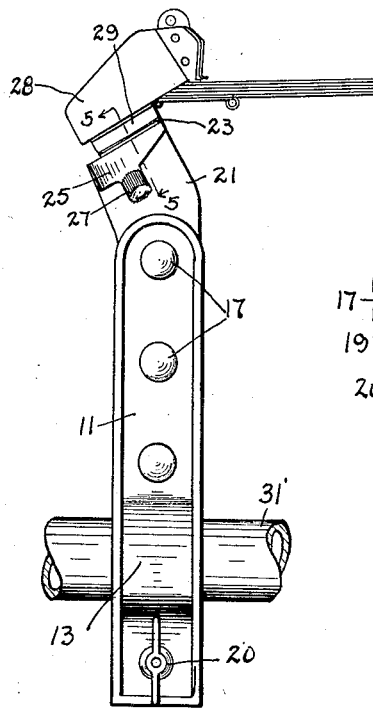
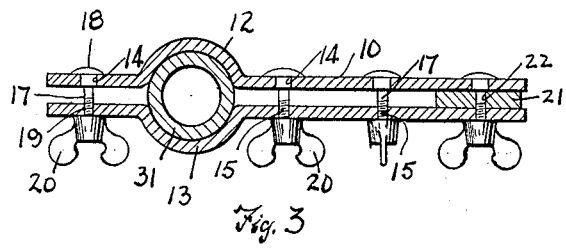
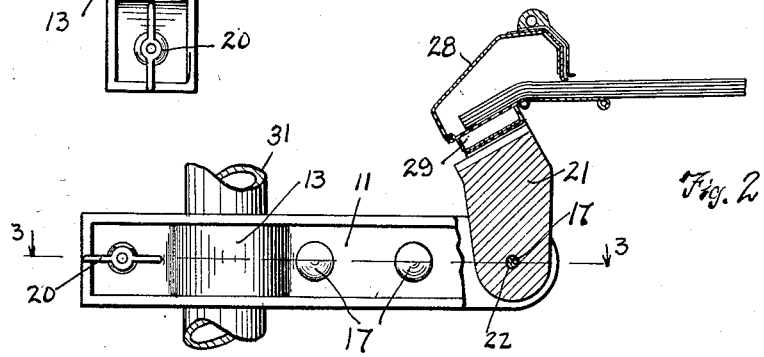
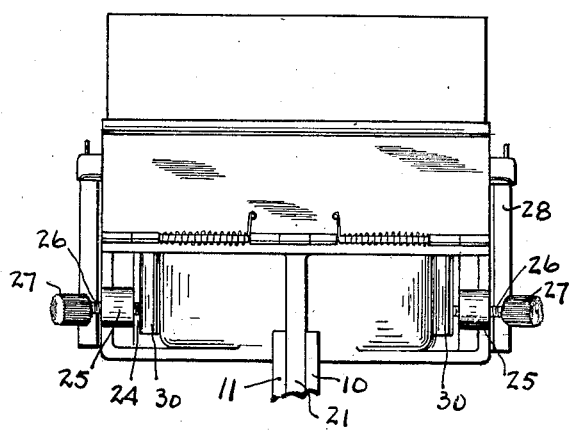
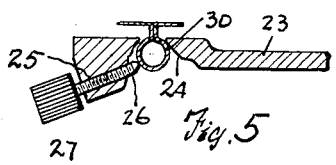
INVENTOR.
Murdock Macdonald
BY Fay, Oberlin & Fay
ATTORNEYS.

Patented Feb. 25, 1930

1,748,235

UNITED STATES PATENT OFFICE

MURDOCK MACDONALD, OF CLEVELAND, OHIO

TICKET-BOX SUPPORT

Application filed October 5, 1927. Serial No. 224,191.

The present invention relates, as indicated, to a support, and more particularly to a support for a ticket box of the type disclosed in my copending application Serial No. 167,146, filed Feb. 10, 1927. It is the object of this invention to provide a support for such a box which will be easily attachable to convenient standards, which may be attached to a horizontal standard, a vertical standard, or a standard at some angle between the horizontal and the vertical and still hold the ticket box or other element which is to be supported in the proper and most convenient position for use.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of the support showing it attached to a horizontal standard; Fig. 2 is a side elevation partly in section showing the support attached to a vertical standard; Fig. 3 is a horizontal section on the line 3—3 of Fig. 2; Fig. 4 is a bottom plan view of the ticket box showing its connection to the support; and Fig. 5 is a fragmentary sectional view disclosing most clearly the means whereby the ticket box it attached to the support.

The support comprises two mating members 10 and 11, each of which is provided with a semi-cylindrical portion 12, 13. The member 10 is further provided with a plurality of apertures 14 of polygonal cross-section, while the member 11 is provided with a similar series of cylindrical apertures 15. Bolts 17, having polygonal shanks 18 and screw threaded stems 19, are received in the apertures, it being understood that the shank 18 of each bolt fits a corresponding polygonal aperture 14 in the member 10, while the stem 19 passes through a corresponding aperture 15 in the member 11. A wing nut 20 is provided for each bolt 17 and it will be readily understood that the members 10 and 11 may be clamped together by adjustment of the wing nuts 20, the shanks 18 cooperating with the apertures 14 to prevent rotation of the bolts 17 with the wing nuts 20.

Clamped between the members 10 and 11 and carried on the bolt 17 farthest removed from the semi-cylindrical portions 12, 13 is an arm 21 having an aperture 22 in one end thereof for the reception of said bolt 17. Said arm 21 is substantially in the form of a T, being provided with a substantially plane surface 23 at its free end. The under surface of the platform of said T-shaped arm is provided with one or more (preferably two) beveled slots 24 and with a lug 25 adjacent each one of said slots. Each lug 25 is adapted to receive a set screw 26 having a knurled head 27, in a tapped hole which is drilled at an angle to the plane surface 23 for a reason which will be hereinafter explained.

The ticket box 28 is provided on its under surface with a shell 29 which receives latch members, as is disclosed in my said co-pending application, and the bottom wall of said shell is rebent, as clearly shown in Fig 5, to form one or more (preferably two) tubular projections 30 extending downwardly from the under face of said shell.

In use, the two members 10 and 11 are disconnected from each other by removing the wing nuts 20 and are placed on opposite sides of a standard 31 or 31', as indicated in Figs. 1 and 2, with the semi-cylindrical portions 12, 13 abutting said standard. The wing nuts are then screwed back onto the bolts and set up sufficiently to hold the support in position on the standard during further adjustment. The arm 21 is then adjusted to the proper position, depending, of course, upon the position of the standard 31 or 31'. In this connection attention is called to the two positions in which the arm 21 is shown in Figs. 1 and 2, respectively. The present invention is intended for use primarily on street cars and auto busses, and it often happends that it is necessary to mount the support on a standard which happens to be convenient to the conductor's post of duty and which runs at an odd angle. The support of this invention is sufficiently flexible so that, no matter at what angle the standard 31 and 31' may be disposed, the ticket box 28 may always be disposed in the proper and most convenient position. The adjustment of the ticket box 28 is of course effected by swinging the arm 21 about its pivot point on the bolt 17 to the desired position and then setting up the wing nut on said bolt to such position as to clamp the arm 21 tightly between the members 10 and 11. After the arm has been adjusted, the set screws 26 are backed away from their projection into the slots 24 and the tubular projections on the ticket box are slid into the slots. Thereafter the set screws 26 are advanced into said slots until they contact with the projections 30. Due to the angle at which the screws 26 are mounted in the lugs 25, it will be obvious that setting up the screws will tend to force the projections 30 more deeply into the beveled slots 24, thereby providing a secure and solid connection between the support and the ticket box.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with an element to be supported, said element having a tubular projection extending from its bottom wall, of a pivotally supported arm provided with a beveled slot receiving said projection, and a set-screw projecting into said slot and bearing on said projection.

2. The combination with an element having a tubular projection extending from its bottom wall, of a pivotally supported arm having a substantially plane upper face and provided with a beveled slot in the plane of said face receiving said projection, the walls of said slot diverging downwardly, and a set-screw projecting into said slot at an angle to said face and adapted to force said projection upwardly and inwardly to lock said element to said arm.

Signed by me, this 22nd day of September, 1927.

MURDOCK MACDONALD.